United States Patent [19]
Callsen et al.
[11] Patent Number: 4,876,905
[45] Date of Patent: Oct. 31, 1989

[54] POSITIONING ARRANGEMENT FOR A MEASURING-VALUE SENSOR

[75] Inventors: Georg H. Callsen; George U. P. Kindler, both of Hamburg, Fed. Rep. of Germany

[73] Assignee: U.S. Philips Corporation, New York, N.Y.

[21] Appl. No.: 224,083

[22] Filed: Jul. 25, 1988

[30] Foreign Application Priority Data

Jul. 28, 1987 [DE] Fed. Rep. of Germany ....... 3724897

[51] Int. Cl.4 ........ G01B 7/14
[52] U.S. Cl. ........ 73/866.5
[58] Field of Search ........ 73/866.5, 493, 494, 73/518-520, 660, 661; 374/148; 248/27.1, 542; 74/22 A, 424.8 R, 89.15; 324/208, 173

[56] References Cited

U.S. PATENT DOCUMENTS

| | | | |
|---|---|---|---|
| 2,780,094 | 2/1957 | Fink | 73/866.5 |
| 2,946,218 | 7/1960 | Karpchuk | 73/660 |
| 3,606,801 | 9/1971 | Williams | 74/424.8 R |
| 3,859,847 | 1/1975 | Ronemus . | |
| 4,635,491 | 1/1987 | Yamamano et al. | 74/89.15 |
| 4,712,440 | 12/1987 | Rousselot | 74/424.8 R |
| 4,739,669 | 4/1988 | Jokose et al. | 74/424.8 R |

FOREIGN PATENT DOCUMENTS

| | | | |
|---|---|---|---|
| 0752143 | 7/1980 | U.S.S.R. | 73/866.5 |

OTHER PUBLICATIONS

"21 001 Proximity Probe Housing Kit", of the Bently Company, Nevada, U.S.A.

*Primary Examiner*—Robert R. Raevis
*Attorney, Agent, or Firm*—Brian J. Wieghaus

[57] ABSTRACT

The invention relates to a positioning arrangement for a measuring-value sensor, which is secured to one end of a guide tube. The other end of the guide tube is connected to a fixedly arranged screw device serving for the longitudinal displacement of the guide tube. A lead connected to the measuring-value sensor extends through the guide tube to an evaluation unit. The longitudinally displaceable guide tube provided with an internal thread is unrotatably arranged and the screw device has a stationary adjustment screw rotatably arranged in the internal thread of the guide tube.

8 Claims, 1 Drawing Sheet

POSITIONING ARRANGEMENT FOR A MEASURING-VALUE SENSOR

BACKGROUND OF THE INVENTION

The invention relates to a positioning arrangement for a meeasuring-value sensor, which is secured at one end of a guide tube, through which a lead connected to the measuring-value sensor extends to an evaluation unit and whose other end is coupled to a fixedly arranged screw device serving to displace the guide tube in the longitudinal direction.

Such positioning arrangements serve, for example, to carry out speed measurements or oscillation measurements on inaccessible rotating parts of a machine. The positioning arrangement mentioned in the opening paragraph is known from the prospectus "21 001 Proximity Probe Housing Kit" of the Company Bently, Nevada, U.S.A. In this case, a housing accommodating a screw device serving for the longitudinal displacement of a guide tube is secured to the machine at an accessible area. The guide tube has at one end an external thread and has at its other end a measuring-value sensor. The measuring-value sensor is taken to the rotating part of the machine by longitudinal displacement of the guide tube. For longitudinal displacement, the guide tube is screwed in a nut which is secured in the housing and has an internal thread matching with the external thread of the guide tube. The measuring-value sensor is connected through a lead extending in the guide tube to an evaluation unit outside the housing. Upon rotation of the guide tube (longitudinal displacement), the lead must be detached from the evaluation unit in order that no rotation of the lead and hence no destruction of the lead takes place. As a result, the operation of adjusting the measuring-value sensor becomes complicated. Moreover, additional plug contacts must be provided.

SUMMARY OF THE INVENTION

The invention has for its object to provide a positioning arrangement, which has a simple construction and permits a simple adjustment without detachment of the lead from the evaluation unit.

In a positioning arrangement of the kind mentioned in the opening paragraph, this object is achieved in that the longitudinally displaceable guide tube provided with an internal thread is unrotatably arranged and the screw device has a stationary adjusting screw rotatably arranged in the internal thread of the guide tube.

In this positioning arrangement, the longitudinal displacement of the guide tube, which is unrotatably arranged, is carried out by screwing an adjusting screw into and out of the guide tube. Since the guide tube does not rotate, the lead connecting the evalation unit to the measuring-value sensor cannot be rotated either. A plug contact is therefore not required at the evaluation unit. Moreover, the adjusting operation is simplified. In fact, during positioning, the adjusting operation can be carried out in dependence upon the received measuring signal of the measuring-value sensor.

In order to prevent a rotation of the guide tube, this tube may have, for example, a polygonal (for example square) cross-section and this tube can be longitudinally displaced in a stationary holder having a fitting polygonal opening. A second possibilty of preventing the rotation of the guide tube consists in that a guide tube having a circular cross-section is used, to which a stud is secured, which is longitudinally displaceable within a stationary guide rail. In a further embodiment of the invention, it is ensured that the adjustment screw is tubular.

A more complicated manner of passing the lead outwards to the evaluation unit, than the manner of passing the lead from the adjustment screw in the form of a tube, is given by a lateral opening at the guide tube.

In a further embodiment of the invention, it is ensured that the adjustment screw is rotatably journalled in a stationary holder. The holder then has an opening, in which the adjustment screw is rotatably journalled. In order that the adjustment screw is not longitudinally displaceable, it can have at one end of the opening a head having a size larger than the opening of the holder and can be held at th other side by a snap ring. It is also possible to make the size of the part of the tube located within the opening and also of the opening itself smaller than that of the part of the tube, at which the external thread extends or which is located outside the opening.

BRIEF DESCRIPTION OF THE DRAWINGS

In order that the invention may be readily carried out, it will now be described more fully with reference to the accompanying drawing, in which.

DESCRIPTION OF THE PREFERRED EMBODIMENTS

Figure 1:
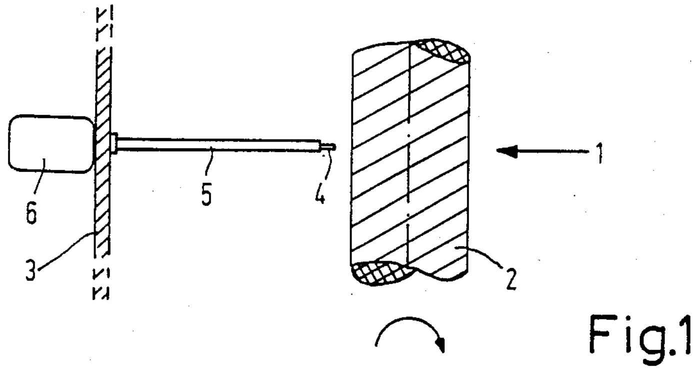
FIG. 1 shows a diagrammatic representation of a part of a machine with a shaft to which a positioning arrangement is secured.

FIG. 1 shows diagrammatically the section of a machine 1 having a rotary shaft 2. The shaft 2 is encapsulated in a machine housing 3. In order to carry out, for example a speed measurement or an oscillation measurement of the shaft, a positioning arrangement 6 is used, which is secured to the machine housing 3 and comprises an adjustment device and a guide tube 5 with a measuring-value sensor 4 secured to the end of the guide tube 5. By means of the adjustment device, which is located outside the machine housing, the measuring-value sensor 4 is taken to the shaft 2 by longitudinal displacement of the guide tube 5 over the desired distance.

Figure 2:
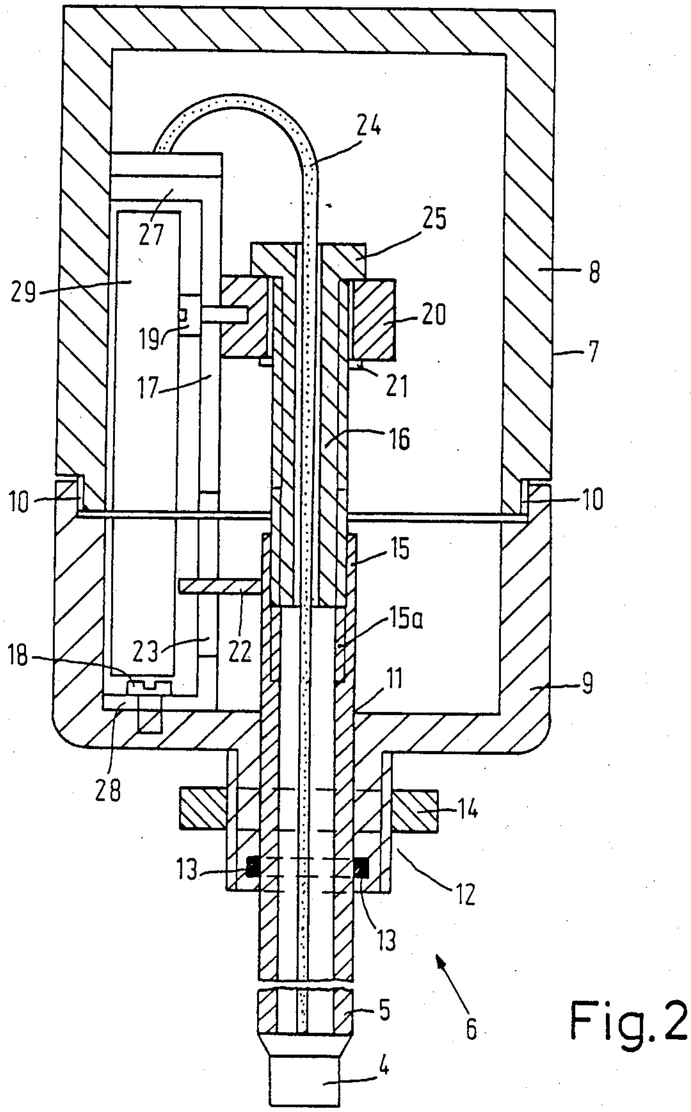
FIG. 2 is a longitudinal sectional view of a positioning arrangement that can be used in FIG. 1.

FIG. 2 shows an embodiment of the positioning arrangement 6. The positioning arrangement 6 has a cylindrical substantially closed housing 7, which consists of an upper housing or lower part 8 and a lower housing or base part 9. The upper housing part 8 and the lower housing part 9. are held together by a screw connection 10. At the end of the housing 7 constituting the lower housing part 9 is present a circular opening 11, whose diameter is approximately equal to the outer diameter of the circular guide tube 5. A tubular stud 12 provided with an external thread is arranged outside the housing 7 at the opening 11 of the lower housing part 9. The inner diameter of the tubular stud 12 corresponds to the diameter of the opening 11. The guide tube 5 extends through the opening 11 and the tubular stud 12 into the housing 7. Further, a sealing ring 13 is inserted into the stud 12 and this ring should prevent a liquid or a gas from penetrating into the interior of the housing 7. For securing the housing 7 to a machine, a nut 14 is provided, which is screwed onto the stud 12.

The end 15 of the guide tube 5, which lies inside the housing 7, has an internal thread 15a, into which a tubular adjustment screw 16 is screwed.

A plate or support 17 rectangularly bent at each of its ends is arranged parallel to the guide tube 5 and to the adjustment screw 16, respectively. The limbs 27 and 28 obtained by bending the plate 17 have the same length and are arcuate at the outer edge in accordance with the cylindrical housing 7. The limb 28 of the plate 17 is secured by a screw 18 to the lower housing part 9. The length of the plate 17, after bending the limbs 27 and 28 is chosen so that a free space exists below the end of the upper housing part 8. By means of a screw 19, the plate 17 has secured to it a holder 20, which has an opening for receiving the adjustment screw 16. The adjustment screw 16 is rotatably held in the opening on the one hand by a hexagonal head 25 and on the other hand by a snap ring 21. The point of securing the holder 20 is chosen so that a sufficient displacement length is given for the guide tube 5.

In the proximity of the end of the guide tube 5, a pin 22 is arranged at right angles to the guide tube 5 and this pin is displaceable within a longitudinal gap 23 in the plate 17. The length of the longitudinal gap 23 is chosen so that a sufficient displacement of the guide tube 5 is guaranteed. The width of the longitudinal gap 23 is chosen so that just the pin 22 projects into it and hence no rotation of the guide tube 5 can occur.

The measuring-value sensor 4 is connected to a lead 24, which extends within the guide tube 5 and the tubular adjustment screw 16. The lead 24, which projects from the adjustment screw 16, is connected to electrical contacts of an evaluation unit 29. These electrical contacts are provided at the limb 27. Within the space constituted by the plate 17, the evaluation unit 29 is accommodated.

By rotation of the adjustment screw 16 fixedly journalled in the holder 20, the guide tube 5 is longitudinally displaced. A rotation and destruction of the lead 12 then cannot occur. Plug contacts, which connect the evaluation unit 29 to the lead 24, are therefore not required. In order to be able to displace the guide tube 5 by means of the adjustment screw 16, the upper housing part 8 must be separated from the lower housing part 9.

What is claimed is:

1. A positioning arrangement for a sensor, comprising:
   - a housing, said housing comprising a base part and a cover part for connection to said base part for enclosing a space therebetween, said base part having a bore therethrough defining an axis of said arrangement;
   - an elongate guide tube having a first end disposed in the interior space of said housing and extending through said bore to a second end external to said housing, said second end being adapted for receiving a sensor, and said guide tube being complementary in shape to said bore for being slidably received therein;
   - guide means for preventing rotation of said guide tube during axial translation of said guide tube through said bore;
   - a tubular adjustment screw disposed within said housing for translating said guide tube in said bore and axially positioning said guide tube with respect to said housing;
   - holding means within said housing for rotatably supporting said adjustment screw and fixing said tubular adjustment screw in the axial direction; and
   - an electrical connection cable extending from said second end of said guide tube through said tubular adjustment screw and having an end portion secured within said housing, said tubular adjustment screw having an internal diameter such that said electrical connection cable extends therethrough with a clearance fit and is not rotated by rotation of said adjustment screw,
   - said adjustment screw and said first end of said guide tube having threaded portions in threading engagement such that rotation of said adjustment screw in a first direction of rotation advances said guide tube away from said housing and rotation of said adjustment screw in the opposite direction of rotation advances said guide tube towards said housing,
   - during rotation of said adjustment screw said guide tube being guided by said guide means and advancing without rotation, and
   - said threaded portions of said guide tube and adjustment screw having a length chosen such that said guide tube has a predetermined range of axial travel.

2. A positioning arrangement as claimed in claim 1, further comprising a support secured to said base part of said housing and extending adjacent said guide tube and tubular adjustment screw into the space enclosed by said cover part,
   - said guide means comprising a longitudinally extending slot in said support opposite said guide tube and a guide pin extending from said guide tube slidably received in said slot for preventing rotation of said guide tube during translation of said guide tube, and
   - said holding means comprising a tubular holder secured to said support for rotatably supporting said adjustment screw, said adjustment screw extending through said tubular holder and having a collar engaging the end of said holder remote from said base part for preventing axial translation of said adjustment screw towards said base part and a spring clip secured to said adjustment screw engaging the end of said holder closest to said base part for preventing axial translation of said adjustment screw in the direction away from said base part.

3. A positioning arrangement as claimed in claim 2, wherein said threaded portions of said adjustment screw and guide tube comprise said guide tube being internally threaded and said tubular adjustment screw being externally threaded.

4. A positioning arrangement as claimed in claim 1, wherein said threaded portions of said adjustment screw and guide tube comprise said guide tube being internally threaded and said tubular adjustment screw being externally threaded.

5. A positioning arrangement as claimed in claim 1, wherein said holding means comprises an elongate support fixed to said base part extending adjacent said guide tube and adjustment screw, a tubular holder fixed to said support for rotatably supporting said adjustment screw, said adjustment screw extending through said tubular holder and having a collar engaging the end of said holder remote from said base part for preventing axial translation of said adjustment screw towards said base part and a spring clip secured to said adjustment screw engaging the end of said holder closest to said base part for preventing axial translation of said adjustment screw away from said base part.

6. A postioning arrangement for a sensor as claimed in claim 1, wherein said guide means comprises a member secured to said base part extending adjacent said guide tube and having an axially extending slot, and a guide pin secured to said guide tube and received in said slot for preventing rotation of said guide tube during axial translation of said guide tube.

7. A positioning arrangement for a sensor, comprising:

a housing, said housing comprising a base part having a planar end wall, a tubular portion extending from said end wall in a first axial direction and a stud centered on said end wall extending in the opposite direction, said stud and said end wall having a bore extending therethrough defining an axis of said arrangement, a cover part for connecting to said base part and enclosing a space therebetween, said cover part having a tubular portion complementary to said side tubular portion of said base part, said tubular portions having complementary threaded end portions for securing said cover part to said base part with threading engagement;

an elongate guide tube extending through said bore, said guide tube having a first end disposed within said housing and a second end external to said housing, said tube being complementary in shape to said bore for being slidably received therein, and said second end being adapted for receiving a sensor;

a tubular adjustment screw for axially positioning said second end of said guide tube with respect to said housing a support secured to said end wall of said base part and extending away from said end wall adjacent said guide tube and said adjustment screw, said support terminating at a predetermined distance from said cover part and having an axially extending slot adjacent said guide tube;

a guide pin secured to said guide tube, extending transversely from said guide tube, and being received in said slot for preventing rotation of said guide tube for axial translation of said guide tube within said bore;

a tubular adjustment screw for axially positioning supporting said tubular adjustment screw, said holder having a first end remote from said base part and a second end closest to said base part, said adjustment screw extending from said guide tube through said holder and having a collar bearing against said first holder end for preventing translation of said holder in the axial direction towards said base part and a spring clip secured to said adjustment screw bearing against said second holder end for preventing axial translation of said adjustment screw away from said base part;

an electrical connection cable extending from said second end of said guide tube through said guide tube, passing through said tubular adjustment screw, and having an end secured to said support;

said tubular adjustment screw and said first end of said guide tube having threaded portions in threading engagement such that rotation of said adjustment screw in a first direction of rotation advances said guide tube away from said housing and rotation of said adjustment screw in the opposite direction of rotation advances said guide tube into said housing, during translation of said guide tube said guide pin advancing in said slot and preventing rotation of said guide tube, and said tubular adjustment screw having an internal diameter chosen such that said cable passes therethrough with a clearance fit and is free of rotation during rotation of said adjustment screw.

8. A positioning arrangement as claimed in claim 7, wherein said threaded portions of said adjustment screw and guide tube comprises said guide tube being internally threaded and said tubular adjustment screw being externally threaded, and said guide pin being secured to said guide tube in the axial region bound by said internal threaded portion.

* * * * *